Figure 1:
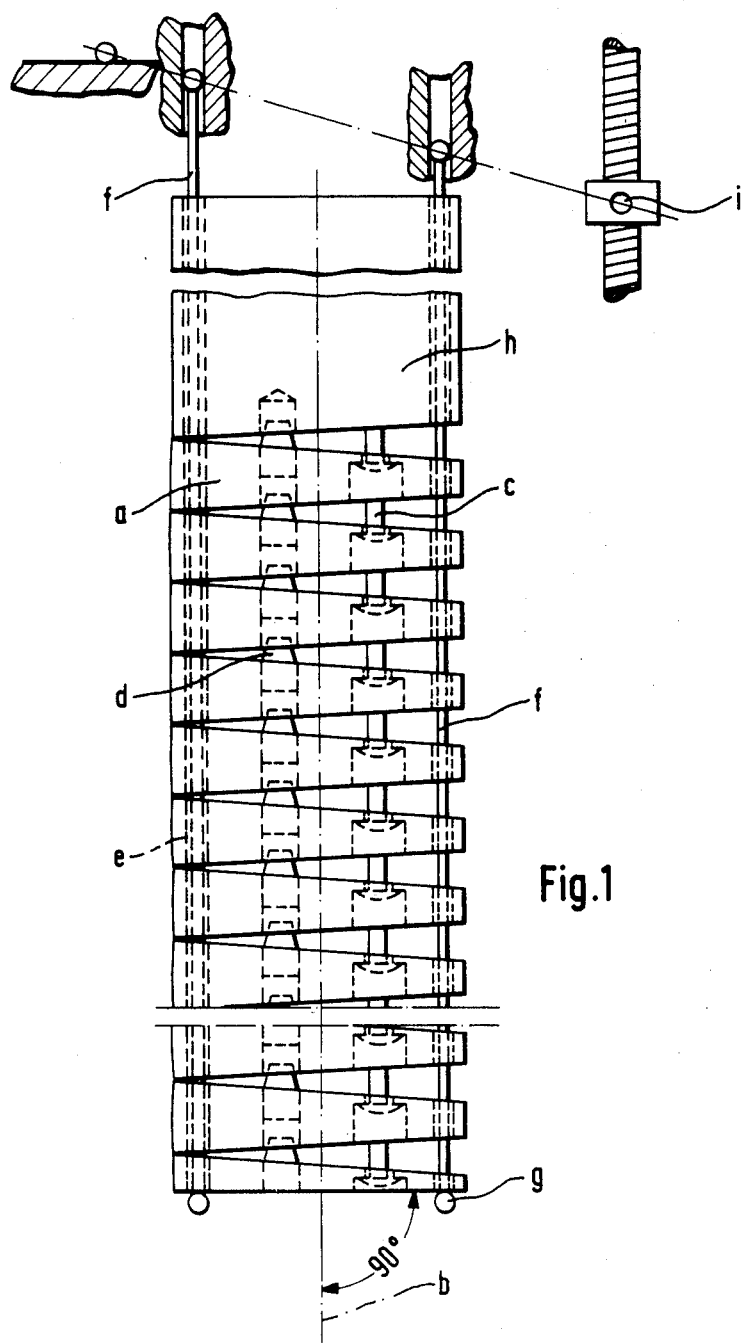

United States Patent [19]

Barainsky

[11] Patent Number: 4,721,280
[45] Date of Patent: Jan. 26, 1988

[54] INJECTION MOULDING CORE FOR PIPE BENDS

[75] Inventor: Rudolf Barainsky, Vlotho, Fed. Rep. of Germany

[73] Assignee: Agru Alois Gruber & Sohn Offene Handelsgesellschaft, Bad Hall, Austria

[21] Appl. No.: 811,838
[22] PCT Filed: Apr. 10, 1985
[86] PCT No.: PCT/DE85/00115
§ 371 Date: Dec. 4, 1985
§ 102(e) Date: Dec. 4, 1985
[87] PCT Pub. No.: WO85/04604
PCT Pub. Date: Oct. 24, 1985

[30] Foreign Application Priority Data

Apr. 14, 1984 [DE] Fed. Rep. of Germany ....... 3414231

[51] Int. Cl.$^4$ .......................... B22C 9/10; B29C 33/48
[52] U.S. Cl. ...................................... 249/185; 164/346; 249/63; 249/144; 425/577
[58] Field of Search ................ 164/346, 345; 249/184, 249/185, 63, 144; 425/577

[56] References Cited

U.S. PATENT DOCUMENTS

| | | | |
|---|---|---|---|
| 223,820 | 1/1880 | Shehan | 249/184 X |
| 3,095,613 | 7/1963 | Christensen et al. | 249/184 X |
| 3,417,601 | 12/1968 | Werner | 72/465 |
| 3,545,718 | 12/1970 | Shale | 249/184 X |

FOREIGN PATENT DOCUMENTS 1952758 4/1971 Fed. Rep. of Germany ...... 164/346
1188569 9/1959 France .

Primary Examiner—Gene P. Crosby
Assistant Examiner—J. Reed Batten, Jr.
Attorney, Agent, or Firm—Fisher, Christen & Sabol

[57] ABSTRACT

Injection moulding core for pipe bends, with at least one straight pipe terminal portion, wherein the bend core is divided in various segments (a) which are preferably wedge-shaped when viewed sideways and which are connected by appropriate elements preferably mushroom-shaped projections (c) to form a chain so that the medial line (b) of the chain of segments may form a straight line, and which are mutually fixed by appropriate elements, preferably centering pins (d) or adjusting springs and/or an edge overlapping the various segments (a), in order to avoid any displacement and torsion, and which comprise one or a plurality of holes (e) through which pass one or a plurality of traction elements, preferably metal cables (f) which are connected to the last segment (a) of the chain, whereas they are connected to displacement elements (i) at the other end of the chain by means of a core (h) fixed preferably to that end of the chain and provided for the straight pipe terminal portion.

1 Claim, 3 Drawing Figures

INJECTION MOULDING CORE FOR PIPE BENDS

The invention relates to an injection moulding core for pipe bends which have at least one straight pipe terminal portion.

It is a known fact that the main problem in the manufacture of pipe bends with straight terminal pipes or with a tight sleeve using the injection mould process is presented by the mould core and that, using the core slide technique, the complete circular section along the whole length of the bend, of 90° for example, can only be achieved if the condition $R \leq \frac{2}{3} D$ has been satisfied, whereby R is the bend mean radius and D is the internal diameter of the pipe.

Larger bend radii can be achieved using the so-called melting cores which, however, due to difficult handling and problems related to temperature, and not least the high costs for this area of application, have not been successful in practice—also considering that an automatic run of such tools is not realistic. The last point also applies to the so-called insertion cores the dimensions of which narrow down the band of application to a great extent i.e. a perfect demoulding is no longer possible for slightly longer straight pipe terminal portions of approx. 0.5 D.

The invention aims at overcoming the above described defects by the creation of an appropriate injection moulding core for pipe bends.

The solution to the task thus set is shown in the claims.

Figure 2:
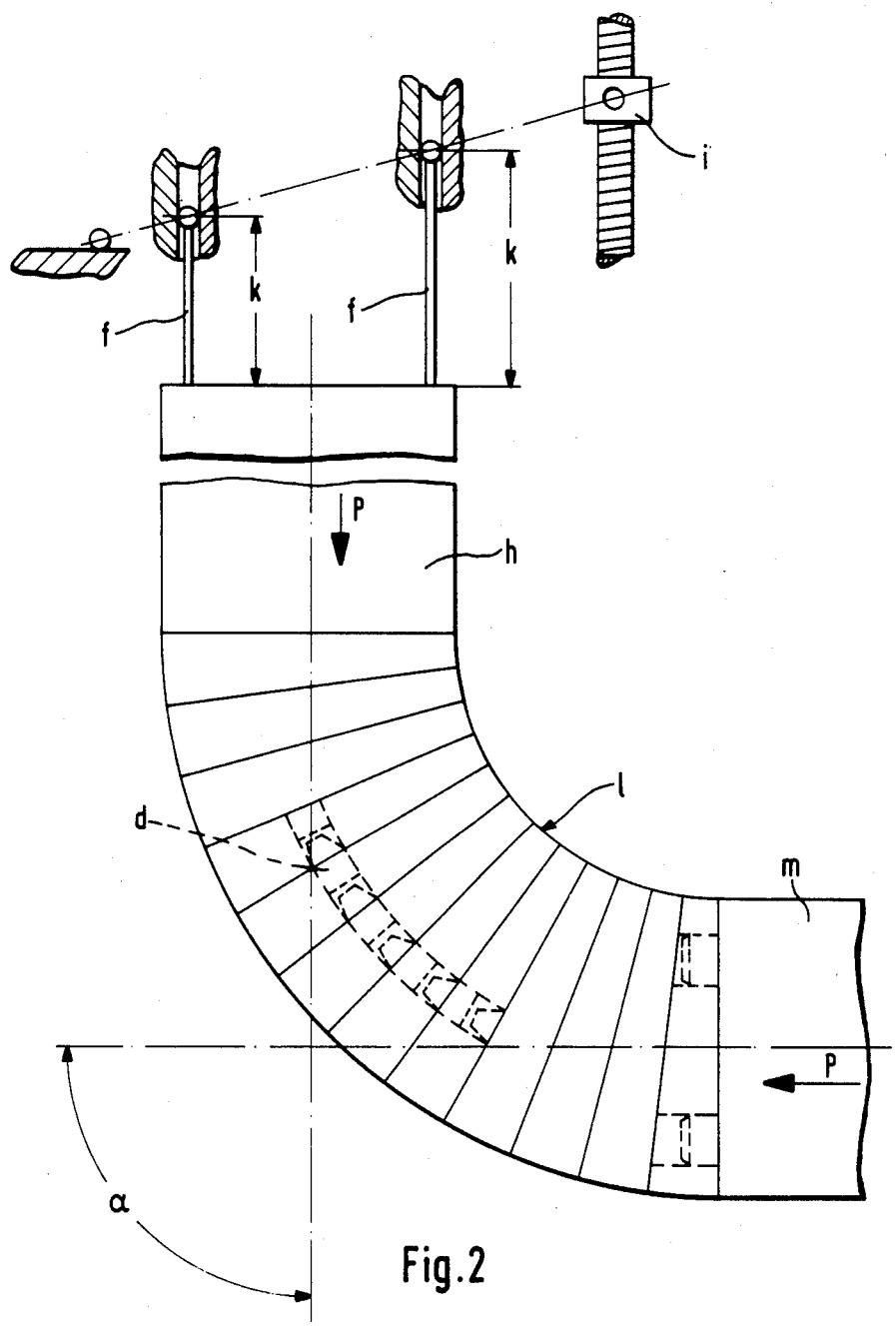
Figure 3:
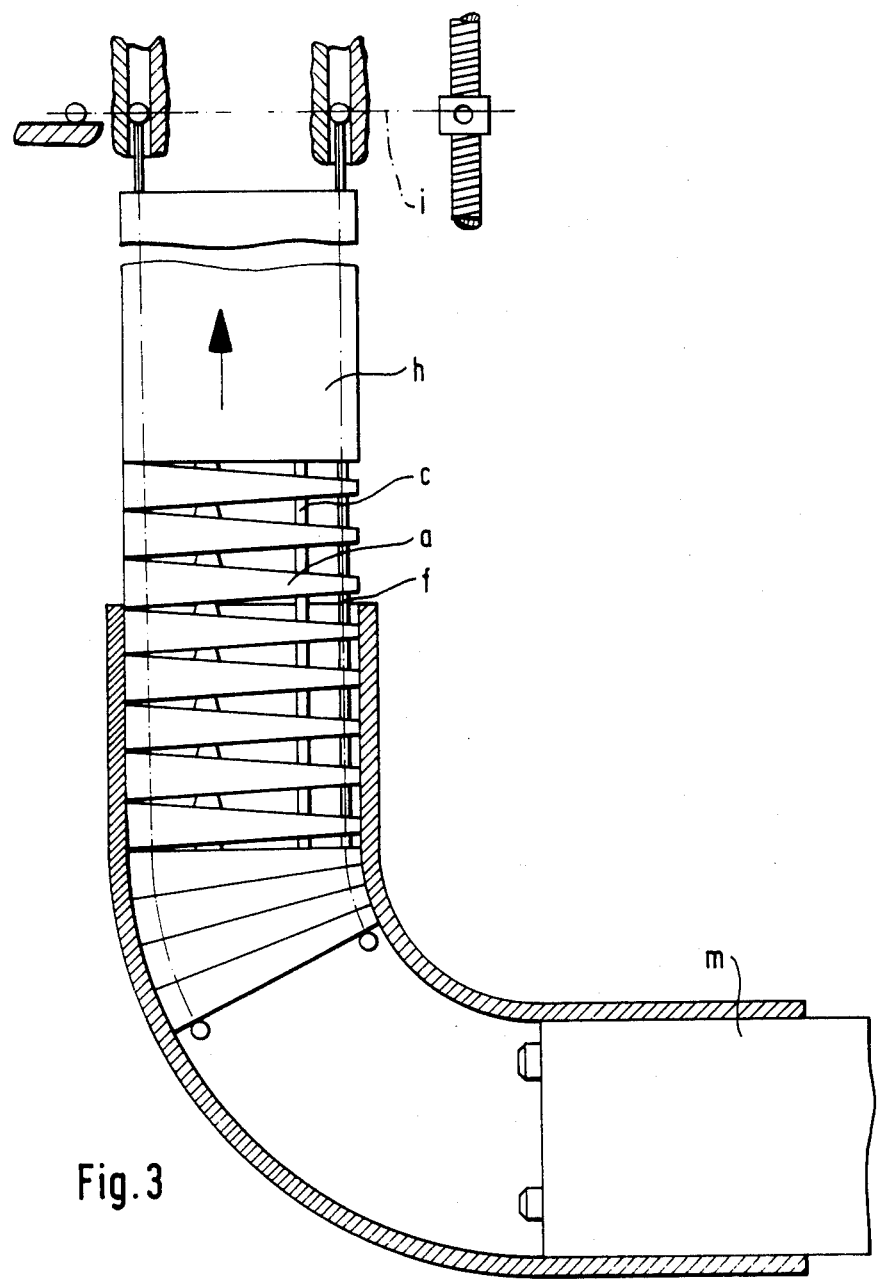

One embodiment of the invention is described using the drawings. These show the following in detail:

FIG. 1 the side view of an injection moulding core according to the invention in distended position, FIG. 2 the side view of the injection moulding core for the bend core from FIG. 1 and FIG. 3 the side view of this injection moulding core during demoulding.

As is shown in FIG. 1, the injection moulding core described here for pipe bends with straight terminal portions is divided in individual segments a, vertical to the medial line b of the bend, and preferably in twelve parts for a bend of 90°. These segments a are connected to a chain with the aid of mushroom-shaped projections c. Since, owing to the larger outer diameter and the smaller internal radius of the bend core, the individual segments a have wedge-shaped side views, these projections c must be formed in such a way that with distended chain the medial line b of the segments a form a straight line. The individual segments a are, furthermore, mutually fixed by conical centering pins d in order to avoid any displacement or torsion. Furthermore, the segments a comprise one or several bores through which pass the metal cables f as traction elements which are connected to the last segment a of the bend core by fixing elements g. At its other end the chain of segments adjoins onto the core h for the straight pipe terminal portion by means of the metal cables f passing through this core, their ends being connected to displacement elements i, as for example to a spindle or to a hydraulic cylinder.

FIG. 2 shows the condition of the chain of segments after the metal cables f have been passed by means of the displacement elements i to the end position k. The segments a have arranged themselves to the bend core 1 according to their wedge-shape. They are finally fixed in position by being brought against the core m for the second straight pipe terminal portion so that the metal cables f predominantly assume the kinetic part of the operation whilst locking is effected by the cores h and m. The centering pins d or other suitable elements prevent the segments a from being pushed from the connection whereby these elements must be conceived for a stress of $P \times \cos \alpha/2$.

FIG. 3 shows the injection moulding core according to the invention during the demoulding process. It can be seen here that removal of the bend core 1 is synchronized with the motion of the displacement elements 1 and the metal cables f accordingly. By way of example, the demoulding conicity with wedge-shape of 7.5° must be equal to 0.03 % of the bend internal radius per bend degree.

I claim:

1. Injection molding core for pipe bends having at least one straight pipe terminal portion which core includes at least one straight end piece and multiple wedge-shaped segments which are connected by means of at least two flexible tension elements, each adjacent the periphery of said wedge-shaped segments to form under tension a curved injection mold core portion, the surface of which in the curved state is free of voids that would accept the flow of material during molding and centering elements provided on each of the wedge-shaped segments to prevent displacement or torsion of said segments during molding.

* * * * *